United States Patent [19]

Murakami

[11] Patent Number: 5,905,853
[45] Date of Patent: *May 18, 1999

[54] IMAGE PRINTING APPARATUS AND METHOD HAVING CHANGEABLE CAPACITY STORAGE MEANS

[75] Inventor: Yutaka Murakami, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,909

[22] Filed: Jul. 10, 1996

Related U.S. Application Data

[63] Continuation of application No. 08/174,451, Dec. 28, 1993, abandoned.

[30] Foreign Application Priority Data

Dec. 28, 1992 [JP] Japan .................................... 4-361293

[51] Int. Cl.[6] ...................................................... G06F 15/72
[52] U.S. Cl. ............................................ 395/115; 345/507
[58] Field of Search ....................................... 395/101, 109, 395/110, 115, 116, 501, 507, 113; 345/189, 501, 507, 509

[56] References Cited

U.S. PATENT DOCUMENTS

| | | | |
|---|---|---|---|
| 5,029,109 | 7/1991 | Ikenoue et al. | 395/113 |
| 5,159,681 | 10/1992 | Beck et al. | 395/116 |

FOREIGN PATENT DOCUMENTS

| | | | |
|---|---|---|---|
| 63-296952 | 5/1988 | Japan | H04N 1/21 |
| 2224191 | 9/1990 | Japan | G06F 15/72 |

*Primary Examiner*—Kee M. Tung
*Attorney, Agent, or Firm*—Fitzpatrick, Cella, Harper & Scinto

[57] ABSTRACT

Efficiency of memory usage is improved by increasing/decreasing the number of bit map areas in accordance with an amount of image data and thereby an image is formed at high speed. When next printing data is received during the printing of data of a page, whether or not an empty bit map area exists is judged. If not, whether or not there is enough area in a RAM to assign a new bit map area is checked. If it exists, that area is assigned as a new bit map area and the image data is rendered there. On the other hand, if a plurality of empty bit map areas exist, only one bit map area is kept and the other areas are released.

6 Claims, 4 Drawing Sheets

IMAGE PRINTING APPARATUS AND METHOD HAVING CHANGEABLE CAPACITY STORAGE MEANS

This application is a continuation of application Ser. No. 08/174,451 filed Dec. 28, 1993, now abandoned.

BACKGROUND OF THE INVENTION

The present invention relates to an image forming method and apparatus, and more particularly to an image forming method and apparatus having bit map areas for a plurality of pages.

A conventional page printer having a general purpose interface receives printing data described in a page description language from a host computer and stores the printing data in an input buffer. The printing data read out from the input buffer is subject to analysis and command processing to generate character patterns and figure patterns. The generated patterns are rendered in a bit map area as image data. Subsequently, the content of the bit map area is formed on a recording medium such as a recording paper as a visual image. Thus printing is performed.

Typically, printing can be performed if a bit map area has the capacity of a sheet (a page) of recording paper. That is, first page data is rendered in the bit map area and then printed. Subsequently, second page data is rendered in the same bit map area and then printed. The above processing is repeated to obtain visual images. However, in fact, many printers have a plurality of bit map areas for a plurality of pages, instead of a single bit map area, to perform high-speed printing. The high-speed printing can be performed by a plurality of bit map areas because of the following reasons:

(1) While the time for the mechanical operations by the printer is constant to print a page of data, the process time of the printing data by the CPU increases as the number of printing pages increases. If plural bit map areas exist, then, data of pages which do not need much time for data processing are rendered in the second and third bit map areas without waiting for printing and paper ejection. Thus, the CPU can avoid waiting for the end of the printing because of a shortage of memory.

(2) In the case of double-sided printing, in order to print at a high speed, the printing order of pages in the printer needs to be different from the physical order of pages of a document because of the paper feeding structure of the printer engine. For example, a first page of a document is printed on the front sided of a first recording paper, and next the third page of the document is printed on the first sided of the second recording paper. Then, the first recording paper is reversed, the second page of the document is printed on the reversed-side and the first recording paper is ejected. Subsequently, the fifth page of the document is printed on the front sided of the third recording paper. The second recording paper is reversed, the fourth page of the document is printed on the reversed-side and the second printing paper is ejected. Subsequently, the seventh page of the document is printed on the front sided of the fourth recording paper. Thus the printing is continued.

The printer can perform the double-sided printing at the highest speed in the above-described process. If the paper transferring and reversing are performed so that the document is sequentially printed from the first page in the physical order of pages of the document, the printing speed decrease considerably. However, when the printing is performed by the above-described process, bit map areas for at least three pages are required since the printing data is transmitted from the host computer in the order from the first page of the document.

As described above, if a large capacity RAM is available, an apparatus having a plurality of bit map areas can be produced. In this case, however, each of the bit map areas requires a relatively large RAM area, resulting in increasing cost of the entire printer.

The RAM area includes, for example, areas used as a cache memory which stores, e.g. font data developed in advance and a storage area which temporarily stores other data used for various processings. The efficiency of using the limited memory resource changes in dependence on the data content. However, in the conventional printer, the capacity of a bit map area is set to a constant value by turning on the power to the printer, or an operation of a panel on the printer or a command from an external host computer. In any case, the subsequent processing is performed based on the set capacity value regardless of the content of the printing data. Accordingly, there is a problem in that the number of bit map areas may be more than needed or less than needed, and thereby the area available as a cache may be is smaller than needed.

SUMMARY OF THE INVENTION

It is an object to produce an image forming method and apparatus thereof which increase an efficiency of memory usage and achieve high-speed image forming by increasing or decreasing the number of pages of bit map areas in accordance with an amount of image data transferred.

According to the present invention, the foregoing object is attained by an image forming apparatus which includes storage means for storing image data in units of a page in a bit map area, said storage means having a capacity capable of including a plurality of bit map areas, first judging means for judging whether a number of the bit map areas in said storage means is enough to transfer image data, changing means for changing the number of bit map areas in said storage means based on a judging result of said first judging means during forming images, and image forming means for forming a visual image from image data stored in the number of bit map areas changed by said changing means.

Furthermore, the foregoing object is attained by an image forming method which includes preparing storage means which has a capacity capable of including a plurality of bit map areas, judging whether a number of the bit map areas in said storage step is enough to transfer image data, changing the number of bit map areas in said storage means step based on a judging result of said first judging step, forming a visual image from image data stored in the number of bit map areas changed by said changing step, and performing said judging and changing steps at a predetermined timing during forming images Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
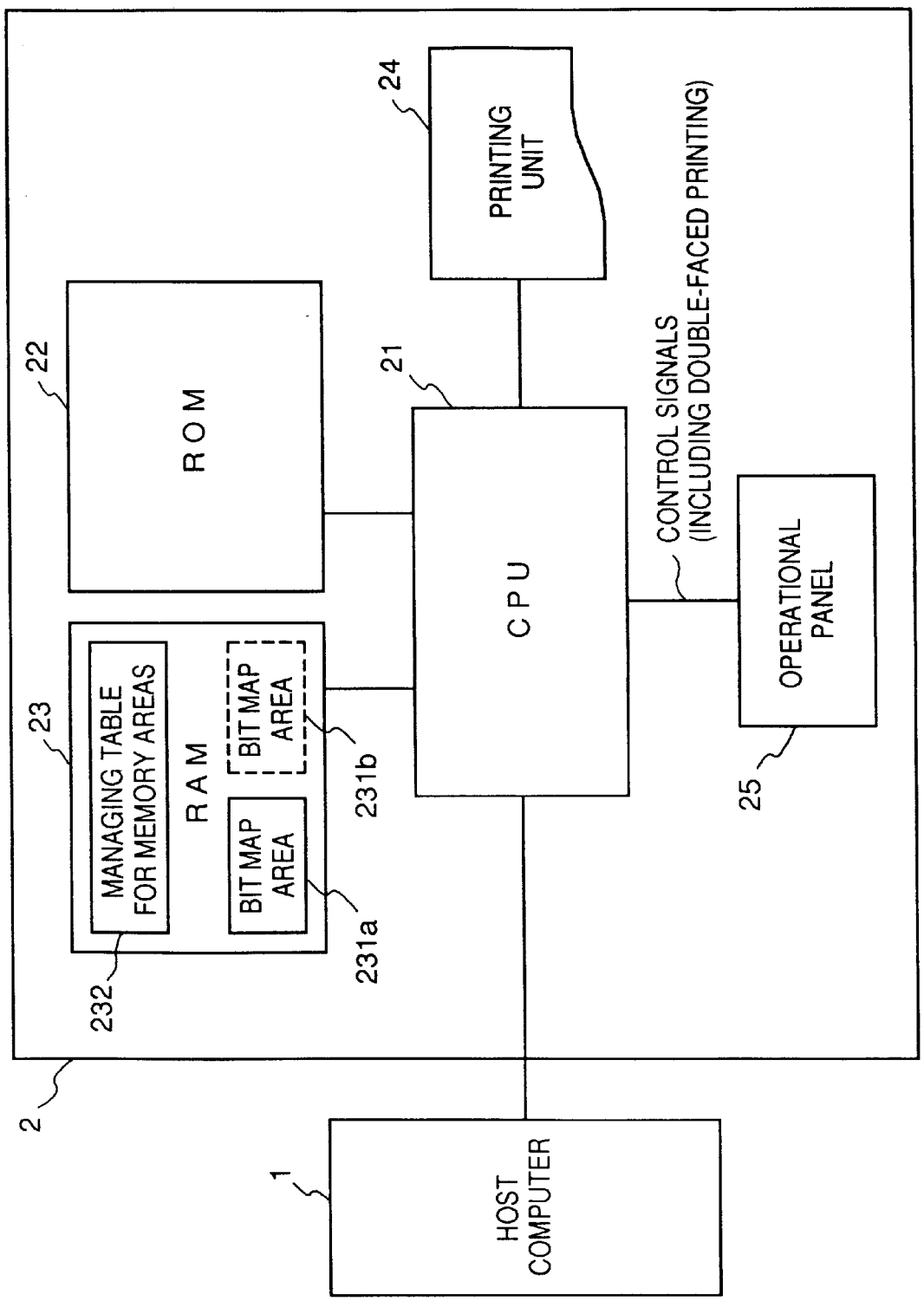
FIG. 1 is a block diagram illustrating a general construction of the printing apparatus according to an embodiment.

FIG. 1 is a block diagram illustrating the construction of a printer of the embodiment. Numeral 1 is a host computer which transmits printing data described in page description language to a printer 2. The printer 2 prints the printing data transmitted from the host computer 1 on a recording medium. Numeral 21 is a CPU which controls the entire operation of the printer 2. Numeral 22 is a ROM which stores control programs and various data. Numeral 23 is a RAM which includes areas such as a bit map area, a cache area which stores, e.g., font data developed in advance and a storage which temporarily stores other data used for various processings. Numerals 231a and 231b are each respectively a bit map area used as a bit map memory in the RAM 23 where interpreted printing data are rendered as image data. Numeral 232 is a managing table for memory areas of RAM 23, of which the structure is shown FIG. 3. Numeral 24 is a printing unit which forms a visual image on a recording paper from the image rendered on the bit map area 231a and/or 231b. Numeral 25 is a operational panel which gives some instructions including double-faced printing to the CPU 21.

Figure 3:
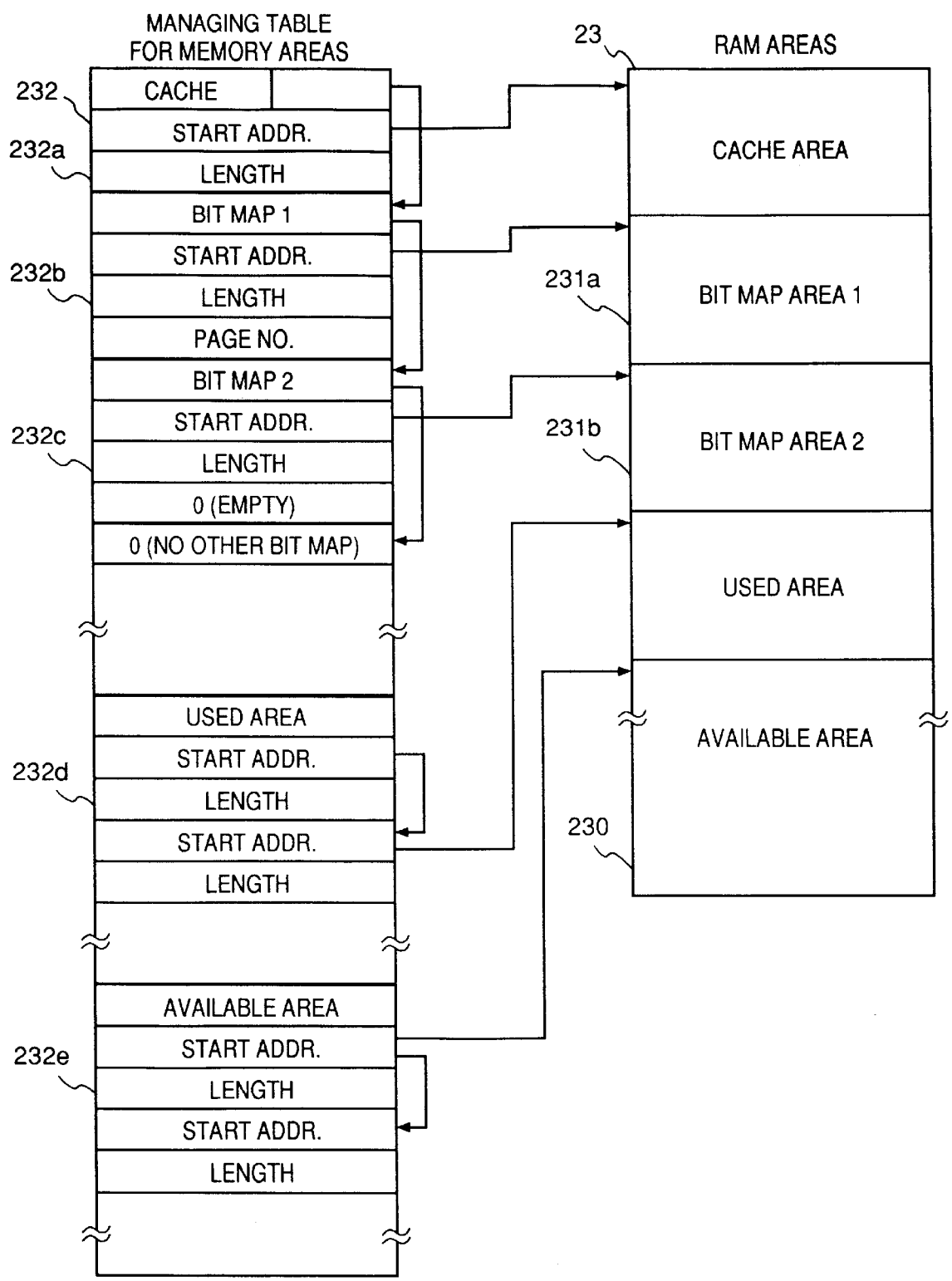
FIG. 3 is a diagram illustrating a detail structure of the managing table and memory areas.

The detail structure of the managing table 232 and for managing RAM areas is shown in FIG. 3.

The managing table 232 includes a cache area pointer 232a, bit map area pointers 232b and 232c, a used area pointer 232d and an available area pointer 232e. In the embodiment, the bit map area pointers 232b, 232c and the available area pointer 232e are used.

Each pointer has a start address, an area length in RAM area, and other specific data. The bit map area pointers 232b, 232c have a page number as a specific data. The page number identifies image data in corresponding bit map area in RAM 23. When the page number is equal to "0", the corresponding bit map area is empty. One bit map pointer also points to another next bit map pointer. When a position which is pointed by a bit map pointer has "0", the bit map pointer is the last pointer. In FIG. 3, there are shown two bit map pointers 232b and 232c, and bit map area 231a has image data and bit map area 231b is empty.

The available area pointer points to an available area 230. The available area 230 may be composed from a plurality of areas which are linked each other. When the available area 230 is larger than a bit map area, it is allowable to create a new bit map area.

In the printer 2 having the above construction, the number of bit map areas 231 is increased or reduced in accordance with the content of the printing data. The process of changing the number of bit map areas 231 based on the content of the printing data is described below with reference to the flowchart of FIG. 2.

Figure 2:
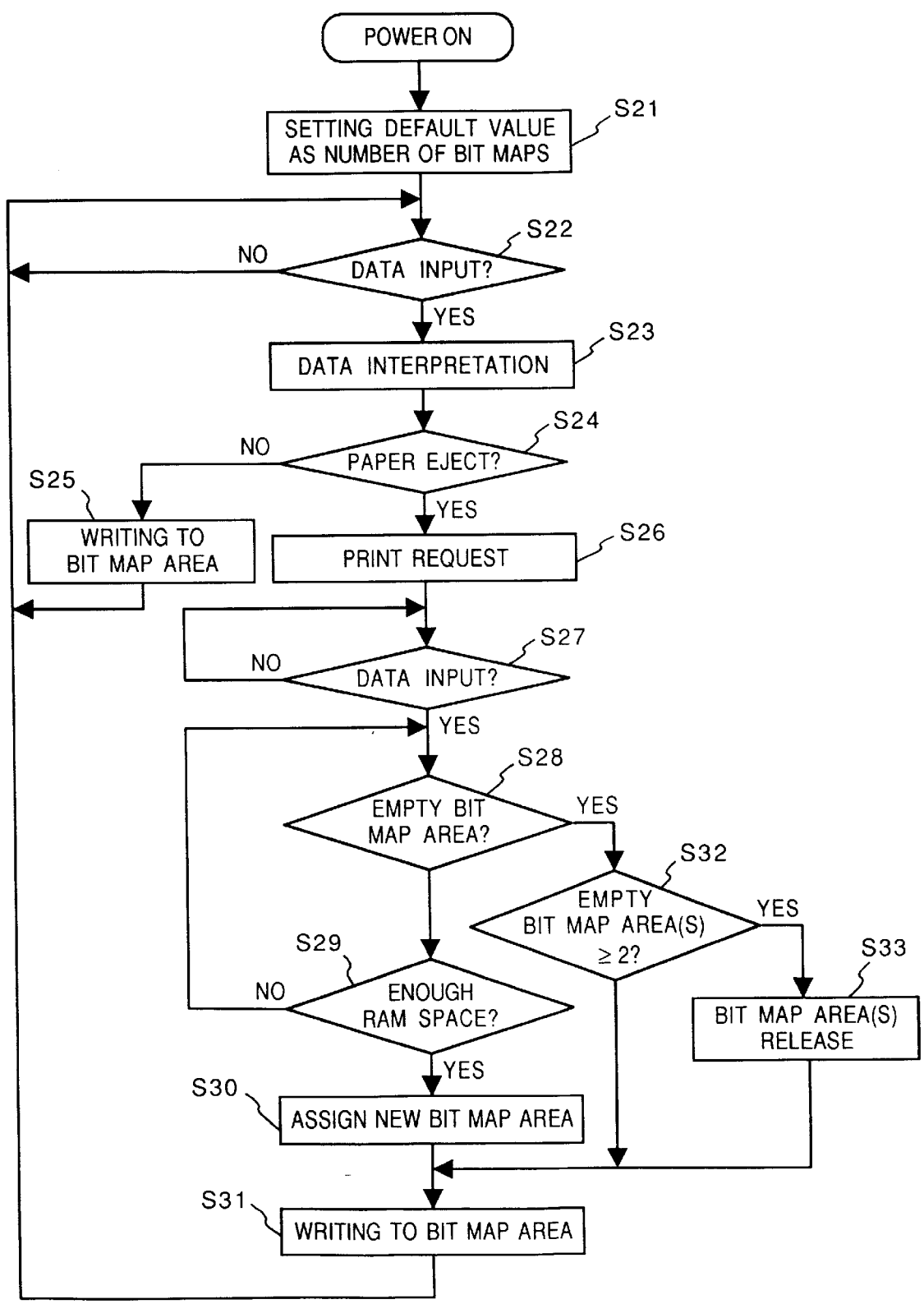
FIG. 2 is a flowchart illustrating a procedure of a image forming processing of the embodiment.

FIG. 2 is a flowchart illustrating the image forming process of the printer 2 in the embodiment. At step S21, a first bit map area is assigned in the RAM 23. Note that the default number of the bit map area 231 is set to "1" in advance. At step S22, a reception of printing data is waited. When printing data is received, the process proceeds to step S23 where the content of the printing data is interpreted. If the printing data does not include a paper-eject command, the process proceeds to step S25 where the printing data is rendered in the first bit map area 231. On the other hand, if the printing data includes the paper-eject command, the process proceeds to step S26 where a print request is sent to the printing unit 24. When printing is requested, the printing unit 24 feeds a paper. At this time, the image data on the bit map area 231 is transferred to the printing unit 24 by an instruction from another task of the controlling software. In the printing unit 24, a visual image is formed on the recording paper from the image in the first bit map area 231.

Since it takes a certain time to transfer a recording paper physically or to perform a printing operation, it will be more efficient to allow the CPU to process the next data and to form the next image in parallel with printing. In the printer 2, the software of the CPU has a multi-task structure. After the print request, the task to interpret a command or render image data on a bit map area is started without waiting for completion of printing of the preceding image. When the printing by the preceding print request is not completed, the paper-eject command is stored as a new print request in accordance with the bit map areas. Thus, it is possible to assign a temporary storage for three or more bit map areas and to print images using them.

At step S27, whether or not next reception data exists is determined. If not, data reception is awaited. If data exists, the process proceeds to step S28 where whether or not there is any empty bit map area for rendering a new image is determined. For example, when the first bit map area has a storage capacity of only one page, the first bit map area will not have any space until the preceding recording paper is ejected. In a case where there is no empty bit map area, at step S29, whether or not there is enough space to assign a new bit map area in a free RAM area in the RAM 23 is determined. Here, the free RAM area means an available area of RAM which is not assigned to use. The free RAM area is designated as a (e.g. second) bit map area. If there is no such area, the process returns to step S28 where whether or not there is any empty bit map area is determined. Steps S28 and S29 are repeated until an unused area is formed in the free RAM area as the printing progresses and or a bit map area is assigned as empty after the content of the bit map area is transferred to the recording paper and the paper ejection is completed.

When there is enough area in the free RAM area to include a new bit map area at step S29, the process proceeds to step S30. At step S30, space for a new bit map area is allocated in the free RAM area. At step S31, the data for the next page is rendered in the new bit map area. When there is an empty bit map area at step S28, the process proceeds to step S32 where whether or not there are two or more empty bit map areas is determined. For example, when a page includes a complicated image or numerous printing characters, there may be a case where many bit map areas become empty during the time it takes to analyze and render the page. When there is only one empty bit map area, the rendering on the empty bit map area is performed at step S31. On the other hand, when two or more empty bit map areas exist at step S32, the process proceeds to step S33 where one empty bit map area is kept and the other empty bit map areas are released as a free RAM area. At step S31, the rendering processing is performed on the remaining empty bit map area.

Figure 4:
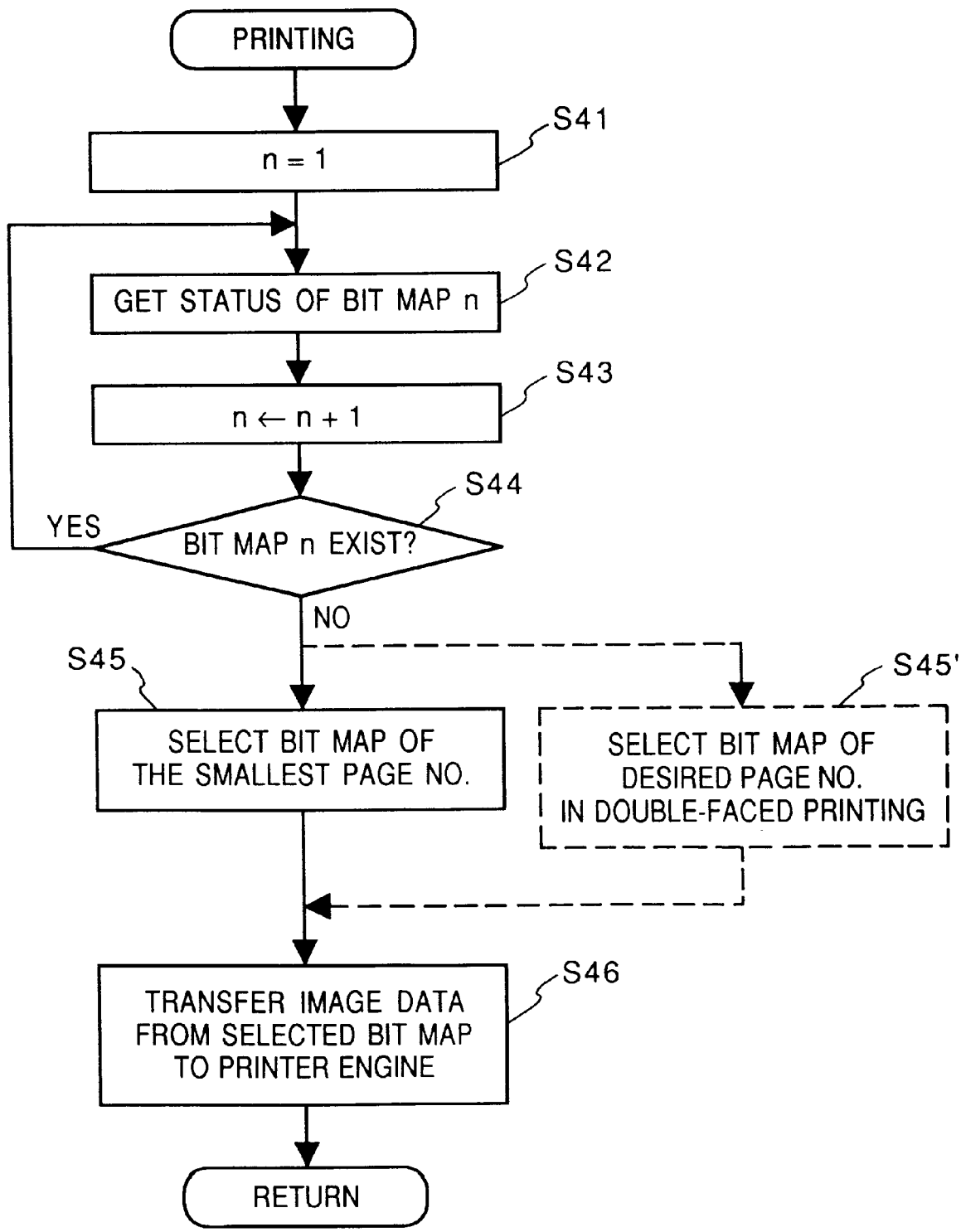
FIG. 4 is a flowchart illustrating a procedure of a printing processing of FIG. 2.

FIG. 4 illustrates a flow chart of the preferred printing process.

Before image data is transferred from a bit map area to a printer engine, at steps S41–S44, all of the bit map pointers already created are read out by searching the bit map pointers sequentially until "0" is found. At step S45, the bit map pointer which has the smallest page number is selected. At step S46, image data in the bit map area pointed to by the selected bit map pointer is transferred to the printer engine.

If double-sided printing is indicated, the process proceeds from step S44 to S45 where a desired page number is selected as described beforehand.

As described above, according to the printer of the embodiment, if the number of bit map areas is more than needed, some are released as a free RAM area. On the other hand, if the number of bit map areas is less than required and the CPU 21 is waiting for an empty bit map area, a new bit map area is assigned in the free RAM area. Thus, the RAM is efficiently used and high-speed printing is performed.

In the embodiment, the number of bit map areas is increased in the case where fewer bit map areas exist less than needed. However, this does not impose a limitation upon the invention. For example, a predetermined maximum value may be set, when the number of bit map areas is increased. Furthermore, it is possible to set the maximum value by command or panel operation, or to automatically set it by a learning function by storing the state of past printing processing.

In the embodiment, as a merit of the RAM having a plurality of bit map areas, an algorithm to increase/decrease the total area of the bit map areas is used so that the CPU's waiting state caused by the shortage of bit map areas is avoided. However, this does not impose a limitation upon the invention. For example, in a printer which performs double-sided printing at high speed, the area of the bit map areas can be increased/decreased with the point of maintenance of the high-speed processing and the efficiency of memory usage.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:

storage means for storing image data, said storage means including a plurality of image storage areas;

rendering means for rendering data received from a host apparatus into the image storage areas;

judging means for judging whether or not a portion of said storage means can be assigned for use as an image storage area for data for an upcoming print operation before completion of a preceding print operation; and control means for, when said judging means judges that the portion can be assigned, assigning the portion of said storage means as an image storage area and initiating operation of said rendering means to render the data for the upcoming print operation into the assigned image storage area before completion of the preceding print operations, said control means further, while said judging means judges that no portion of said storage means can be assigned, waiting until the preceding print operation is complete and then assigning an image storage area by using a portion of said storage means used by the preceding print operation and initiating operation of said rendering means to render the data for the upcoming print operation into the assigned image storing area.

2. An image forming apparatus according to claim 1, wherein said judging means repeats its judging operation, and said control means waits, during the preceding print operation for as long as said judging means continues to judge that no portion of said storage means can be assigned.

3. An image forming apparatus according to claim 1, further comprising releasing means for releasing a portion of said storage means from use as an assigned image storage area when a plurality of assigned image storage areas are not in use.

4. An image forming method of forming an image from image data stored in an image storage area assigned in storage means, said method comprising the steps of:

assigning a plurality of image storage areas in the storage means;

rendering data received from a host apparatus into the image storage areas;

judging whether or not a portion of the storage means can be assigned for use as an image storage area for data for an upcoming print operation before completion of a preceding print operation;

when said judging step judges that the portion can be assigned, assigning the portion of the storage means as an image storage area and initiating operation of said rendering step to render the data for the upcoming print operation into the assigned image storage area before completion of the preceding print operation; and when said judging step judges that no portion of the storage means can be assigned, waiting until the preceding print operation is complete and then assigning an image storage area by using a portion of the storage means used by the preceding print operation and initiating operation of said rendering step to render the data for the upcoming print operation into the assigned image storing area.

5. An image forming method according to claim 4, wherein said judging step repeats its judging operation, and said waiting step waits, during the preceding print operation for as long as said judging step continues to judge that no portion of the storage means can be assigned.

6. An image forming method according to claim 4, further comprising a step of releasing a portion of the storage means for an assigned image storage area when a plurality of assigned image storage areas are not in use.

* * * * *

UNITED STATES PATENT AND TRADEMARK OFFICE
CERTIFICATE OF CORRECTION

PATENT NO. : 5,905,853
DATED : May 18, 1999
INVENTOR(S) : YUTAKA MURAKAMI

It is certified that error appears in the above-identified patent and that said Letters Patent is hereby corrected as shown below:

ON THE TITLE PAGE [56] References Cited

FOREIGN PATENT DOCUMENTS, "2224191" should read --2-224191--.

COLUMN 1

Line 37, "then," should read --the--;
    Line 48, "sided" should read --side--;
    Line 50, "first sided" should read --front side--;
    Line 55, "sided" should read --side--;
    Line 59, "sided" should read --side--; and
    Line 66, "decrease" should read --decreases--.

COLUMN 2

Line 22, "be is" should read --be--; and
    Line 53, "images" should read --images.--.

COLUMN 3

Line 1, "a image" should read --an image--;
    Line 29, "shown" should read --shown in--; and
    Line 32, "a" should read --an--.

COLUMN 4

Line 10, "time," should read --timing,--;
    Line 41, "a" should read --a new--; and
    Line 45, "and or" should read --and--.

UNITED STATES PATENT AND TRADEMARK OFFICE
CERTIFICATE OF CORRECTION

PATENT NO. : 5,905,853

DATED : May 18, 1999

INVENTOR(S) : YUTAKA MURAKAMI

It is certified that error appears in the above-identified patent and that said Letters Patent is hereby corrected as shown below:

<u>COLUMN 6</u>

Line 31, "areas;" should read --areas; and--.

Signed and Sealed this

Fourth Day of January, 2000

Attest:

Attesting Officer

*Acting Commissioner of Patents and Trademarks*